Nov. 20, 1923.  
J. W. ANDERSON  
PHOTOGRAPHER'S STUDIO APPLIANCE  
Filed Jan. 14, 1920  
1,474,809  
2 Sheets-Sheet 2

INVENTOR  
James W. Anderson  
BY Chas. E. Townsend  
ATTORNEY

Patented Nov. 20, 1923.

1,474,809

UNITED STATES PATENT OFFICE.

JAMES W. ANDERSON, OF SAN FRANCISCO, CALIFORNIA, ASSIGNOR TO ANDERSON MANUFACTURING COMPANY, OF SAN FRANCISCO, CALIFORNIA, A CORPORATION OF CALIFORNIA.

PHOTOGRAPHER'S STUDIO APPLIANCE.

Application filed January 14, 1920. Serial No. 351,310.

*To all whom it may concern:*

Be it known that I, JAMES WILLIAM ANDERSON, a citizen of the United States, residing at San Francisco, in the county of San Francisco and State of California, have invented new and useful Improvements in Photographers' Studio Appliances, of which the following is a specification.

This invention relates to an appliance for photographers' studios, and has for its object to provide a turnable support for the subject being photographed, said support having means capable of imparting a rotating or oscillating movement thereto so as to permit of the taking of various exposures of the subject at different angles without requiring the subject to change his pose.

In portrait work it is desirable to obtain a variety of different poses of the subject in order to enhance the chances of getting one or more well suited for development. This ought to be done without requiring the subject to change his position once he is at ease and occupying a natural pose. Therefore, in connection with a multiple view camera of the type shown and described in my pending application Serial No. 340,723 filed November 26th, 1919, I have provided a turnable support for the subject, and mechanism whereby the support may be turned about a vertical axis continuously in one direction or reciprocated in an arcuate path, during which time successive exposures may be taken to show the subject from different angles. Other types of cameras may be used, as for instance an ordinary motion picture camera or still camera.

One form which my invention may assume is exemplified in the following description and illustrated in the accompanying drawings, in which:—

Figure 1:
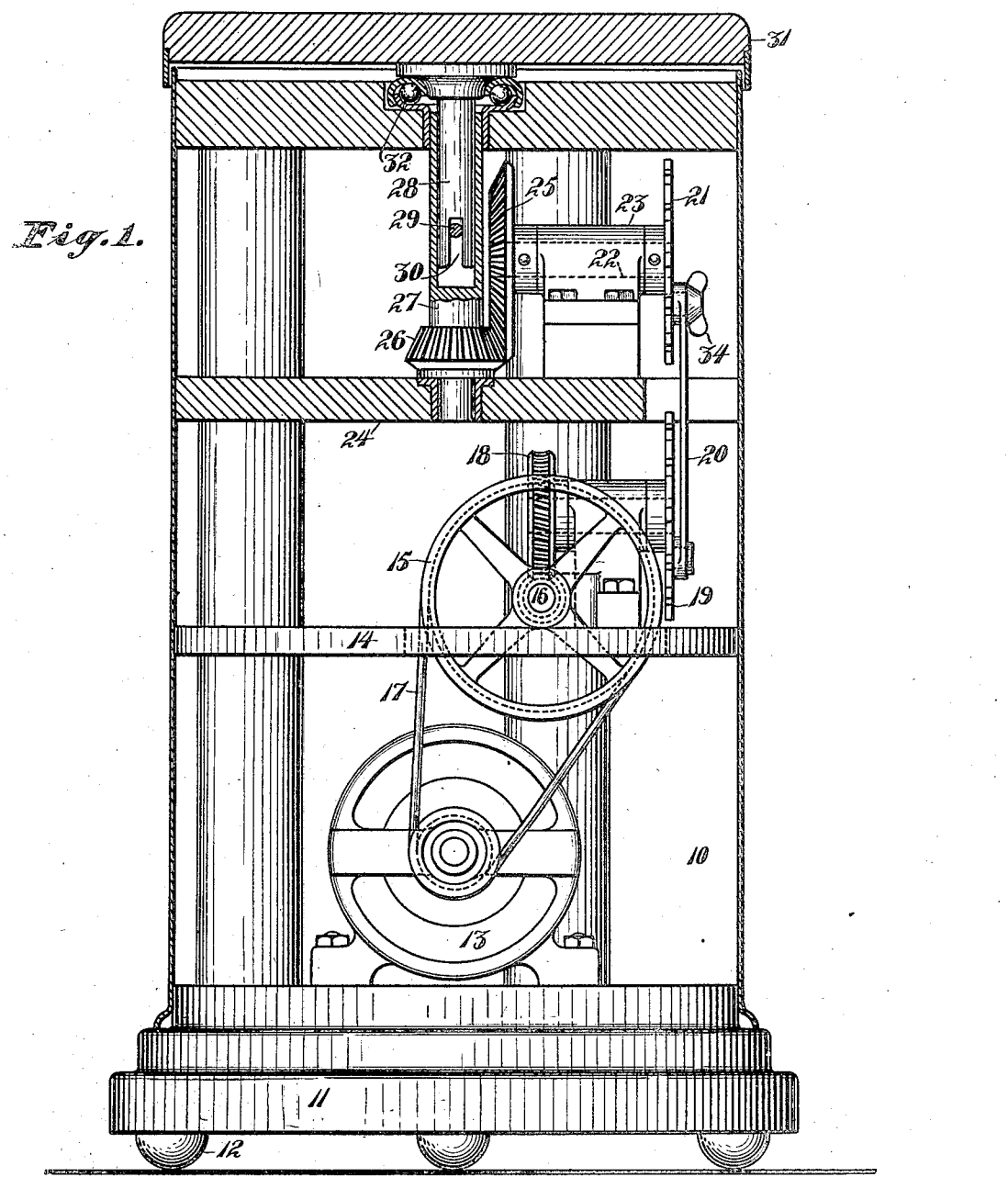
Fig. 1 shows an elevation partly in section of a device embodying my invention.
Figure 2:
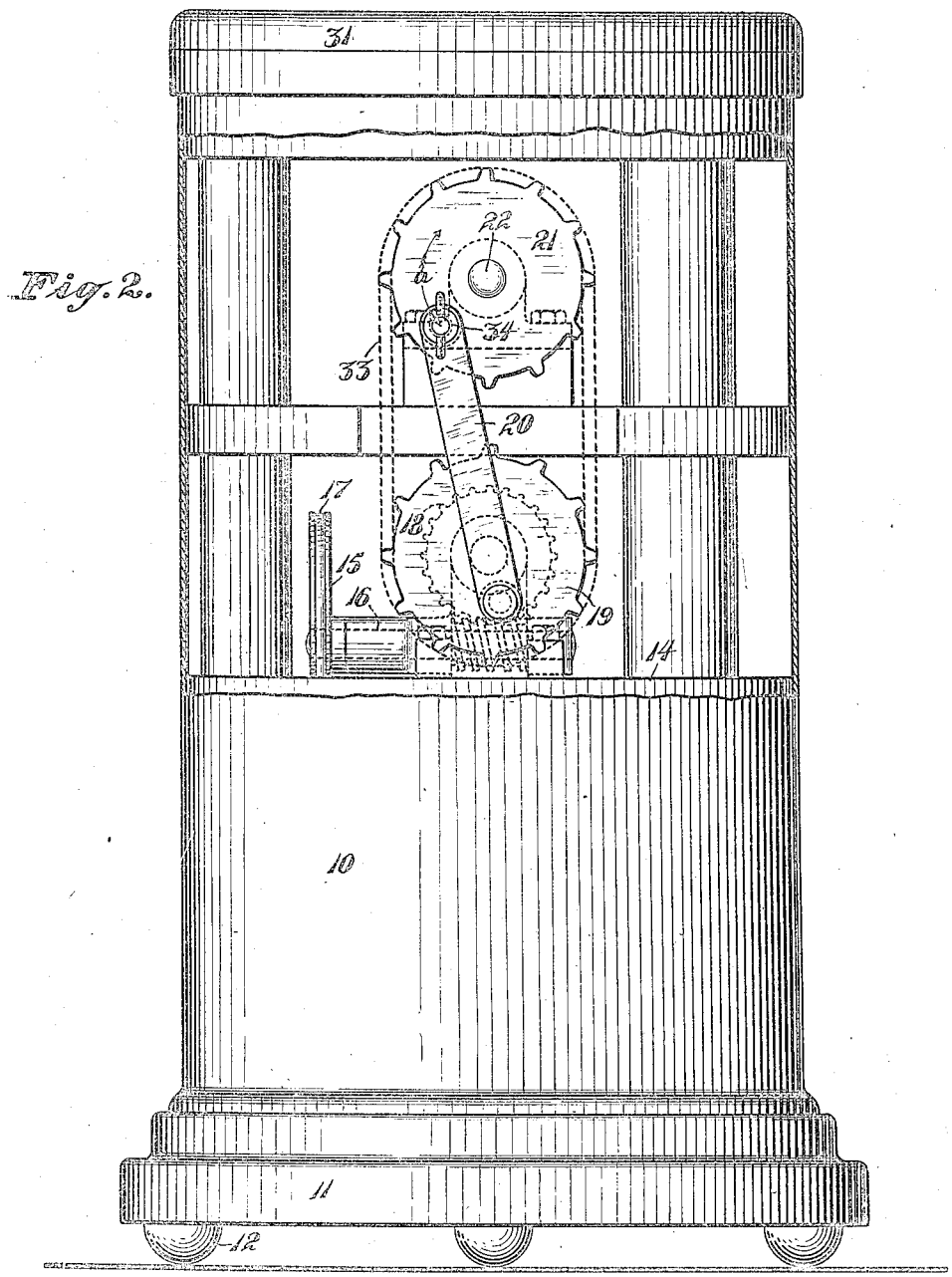
Fig. 2 shows a similar view taken at right angles to Fig. 1.

The specific form of the device shown herein comprises a cylindrical cabinet 10, having a base 11 with feet 12 to rest upon the floor. Within the cabinet and mounted upon the base is a motor 13, and above the motor is a shelf 14 upon which is mounted a pulley 15 on a worm shaft 16, said pulley being driven by a belt 17 connected with the motor. The worm shaft 16 meshes with a worm wheel 18 on the shaft of which is a disc 19 having a connecting rod 20 running to a second disc 21. The second disc 21 is secured upon a shaft 22 journaled in a bearing 23 fixed upon an upper shelf 24 within the cabinet. The shaft 22 carries a bevel gear 25 meshing with a bevel pinion 26 on the lower end of a vertical shaft 27. Said shaft 27 has a telescoping part 28 connected to the outer portion slidably by means of a pin 29 passing through a slot 30. The upper end of the part 28 projects through the top of the cabinet and carries a turntable 31. A ball bearing 32 is arranged between the turntable and top of the cabinet to take the thrust or weight of the turntable.

The connecting rod 20 is such that the second disc 21 operated thereby will not make a full revolution, but only a quarter turn to each half revolution of the driving disc 19. The bevel gears 25 and 26 are so proportioned that the quarter turn of the shaft 22 will impart a half turn to the vertical shaft 27 and turntable 31. Should it be desired to rotate the turntable continuously in one direction, then a chain 33 may be substituted for the connecting rod, the discs 19 and 21 being provided with sprocket teeth for this purpose. A butterfly nut 34 serves to connect the rod 20 with the disc 21 and permits the parts to be readily disconnected. The telescoping shaft is such that the turntable may be lifted off the cabinet without disturbing the driving mechanism.

The subject to be photographed either stands or sits upon the turntable, and the motor 13 is put in operation to rotate or oscillate the turntable, during which time a series of exposures are made. In this way, a series of different pictures of the subject may be made quickly and conveniently and each picture will show the subject from a different angle.

Various changes in the construction and arrangement of the several parts may be employed without departing from the spirit of my invention as disclosed in the appended claims.

Having thus described my invention, what I claim and desire to secure by Letters Patent is:—

An apparatus for obtaining multiple views of a subject being photographed, each view being taken from a different angle, comprising a cylindrical cabinet, a seat rotatably mounted thereon on a vertical axis, a spindle on the seat forming the axis of rotation of said seat, a sleeve journaled within the cabinet to removably receive the spindle and forming a driving connection therewith, a motor within the cabinet and connections between the motor and sleeve for driving the latter, said connections being arranged within the cabinet.

In testimony whereof I have hereunto set my hand in the presence of two subscribing witnesses.

JAMES W. ANDERSON.

Witnesses:
JOHN H. HERRING,
W. W. HEALEY.